United States Patent
Wang et al.

(10) Patent No.: US 12,026,220 B2
(45) Date of Patent: Jul. 2, 2024

(54) ITERATIVE SINGULAR SPECTRUM ANALYSIS

(71) Applicant: PREDICT HQ LIMITED, San Francisco, CA (US)

(72) Inventors: Xuxu Wang, Auckland (NZ); Xiping Fu, Auckland (NZ)

(73) Assignee: PREDICT HQ LIMITED, San Francisco, CA (US)

( * ) Notice: Subject to any disclaimer, the term of this patent is extended or adjusted under 35 U.S.C. 154(b) by 0 days.

(21) Appl. No.: 17/860,844

(22) Filed: Jul. 8, 2022

(65) Prior Publication Data

US 2024/0012876 A1 Jan. 11, 2024

(51) Int. Cl.
*G06F 17/18* (2006.01)

(52) U.S. Cl.
CPC .................................. *G06F 17/18* (2013.01)

(58) Field of Classification Search
CPC ......... G06F 17/18; G06F 17/16; G06N 20/00; G01R 23/165; H03H 17/0255
See application file for complete search history.

(56) References Cited

U.S. PATENT DOCUMENTS

| | | | | |
|---|---|---|---|---|
| 2011/0182352 A1* | 7/2011 | Pace | .................... | H04N 19/543 375/240.1 |
| 2015/0149128 A1* | 5/2015 | Baone | .................... | G06F 30/20 703/2 |
| 2016/0367198 A1* | 12/2016 | Chon | .................. | A61B 5/02416 |
| 2018/0173173 A1* | 6/2018 | Leonard | ............. | G05B 13/0265 |
| 2018/0300737 A1* | 10/2018 | Bledsoe | ........... | G06Q 10/06395 |
| 2019/0022791 A1* | 1/2019 | D'Angelo | ............. | G01J 3/2803 |
| 2020/0399558 A1 | 12/2020 | Ray et al. | | |
| 2020/0402635 A1* | 12/2020 | Patek | ..................... | G16H 50/30 |
| 2021/0057046 A1 | 2/2021 | Liu et al. | | |
| 2021/0326235 A1* | 10/2021 | Penumarthi | ......... | G06F 11/3452 |
| 2022/0172105 A1 | 6/2022 | Nia et al. | | |

OTHER PUBLICATIONS

Sassi et al., "Analysis of Surface Atrial Signals: Time Series with Missing Data?," Annals of Biomedical Engineering, vol. 37, No. 10, Oct. 2009, pp. 2082-2092 (Year: 2009).*

(Continued)

*Primary Examiner* — Shane D Woolwine
*Assistant Examiner* — Yao David Huang
(74) *Attorney, Agent, or Firm* — Hickman Becker Bingham Ledesma LLP (57) ABSTRACT

Techniques for an iterative singular spectrum analysis are provided. In one technique, a first analysis, of time series data, is performed that results in a first reconstructed version of the time series data. The first analysis, of the time series data and a portion of the first reconstructed version, is then performed that results in a second reconstructed version of the time series data. Based on a termination condition, it is determined whether to perform the first analysis relative to a portion of a third reconstructed version of the time series data. A second analysis, of the time series data and a portion of a fourth reconstructed version of the time series data, is performed that results in a fifth reconstructed version of the time series data. The second analysis is different than the first analysis. A difference between the time series data and the fifth reconstructed version data is computed.

20 Claims, 3 Drawing Sheets

(56) References Cited

OTHER PUBLICATIONS

Basu et al., "Automatic outlier detection for time series: an application to sensor data," Knowl Inf Syst (2007) 11(2): 137-154 (Year: 2007).*

Chu et al., "A study of singular spectrum analysis with global optimization techniques," J Glob Optim, Oct. 13, 2013 (Year: 2013).*

L. Kong et al., "Data Loss and Reconstruction in Wireless Sensor Networks," in IEEE Transactions on Parallel and Distributed Systems, vol. 25, No. 11, pp. 2818-2828, Nov. 2014, doi: 10.1109/TPDS.2013.269. (Year: 2019).*

"Failed attempt to handle subtractive cancellation," Mathematics Stack Exchange (archived May 5, 2017). Retrieved on Jun. 29, 2023. Retrieved from <https://web.archive.org/web/20170405224811/https://math.stackexchange.com/questions/628682/failed-attempt-to-handle-subtractive-cancellation> (Year: 2017).*

Wang et al., "Utilizing SVD and VMD for Denoising Non-Stationary Signals of Roller Bearings," Sensors 2022, 22, 195 (Year: 2022).*

Linderman et al., "Zero-preserving imputation of scRNA-seq data using low-rank approximation," Nature Communications 13:192 (Year: 2022).*

Altmann, Andre, et al., "Permutation importance: A corrected feature importance measure", Bioinformatics, May 2010, vol. 26, Issue 10, pp. 1340-1347, https://doi.org/10.1093/bioinformatics/btq134, published Apr. 12, 2010, 9pgs.

Wang, U.S. Appl. No. 18/075,340, filed Dec. 5, 2022, Non-Final Rejection, dated Feb. 22, 2023.

Wang, U.S. Appl. No. 18/075,340, filed Dec. 5, 2022, Final Rejection, dated Jun. 14, 2023.

* cited by examiner

ITERATIVE SINGULAR SPECTRUM ANALYSIS

TECHNICAL FIELD

The present disclosure relates to anomaly detection and, more particularly, to a non-parametric machine learning approach for anomaly detection.

BACKGROUND

Singular Spectrum Analysis (SSA) is a non-parametric machine learning (ML) technique that has been demonstrated to be efficient for anomaly detection and pattern extraction from noisy time series data without previous knowledge of the (nonlinear) dynamics affecting the time series. Despite the merits of SSA, one common challenge of this energy-based approach is determining the number of components during the reconstruction process, which determination has a significant impact on the accuracy of SSA. Also, the performance of SSA is impacted by the number and size of anomalies. For a real-world demand dataset, it is not uncommon to see a significant demand surge when a significant event occurs geographically nearby. These kinds of anomalies impact the decomposition results of SSA in that some (or all) of the anomalies might be absorbed into the trend and seasonality. Thus, there is a need to improve the quality of time series decomposition.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method for improving SSA for anomaly detection in noisy demand datasets are provided. The improved technique is referred to herein as iterative SSA (or "IteSSA"). IteSSA utilizes the idea of boosting ensemble methods and involves decomposing time series data and learns the time series data sequentially. At each iteration, this technique decomposes time series data into simpler time series, referred to as "reconstructed components" (RCs), by multiplying eigenvectors and their corresponding principal components (calculated by multiplying eigenvectors and data). The simpler time series with trend and seasonality information are used for reconstructing/approximating the time series before the decomposition.

System Overview

Figure 1:
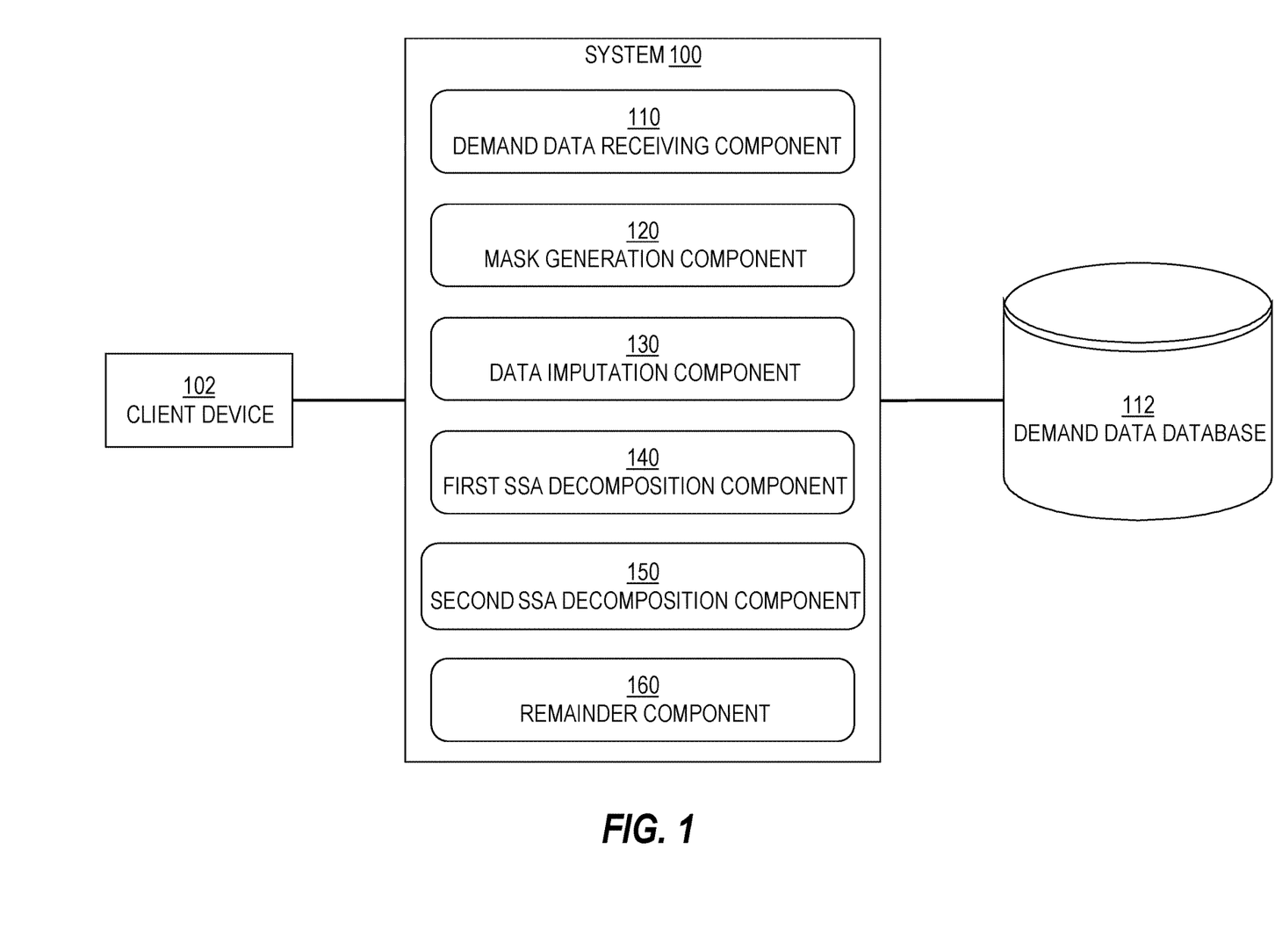
FIG. 1 is a block diagram that depicts an example system for performing iterative singular spectrum analysis (SSA), in an embodiment.

FIG. 1 is a block diagram that depicts an example system 100 for performing iterative singular spectrum analysis (SSA), in an embodiment. System 100 comprises demand data receiving component 110, a mask generation component 120, a data imputation component 130, a first SSA decomposition component 140, a second SSA decomposition component 150, and a remainder component 160. Each component of system 100 may be implemented in software, hardware, or any combination of software and hardware. Each component of system 100 may be implemented on the same computing device or may be implemented on different computing devices. For example, there may be two or more computing devices, each of which implements a different component of system 100.

Although not depicted, system 100 may be connected to a computer network, such as the Internet, a wide area network (WAN), and/or a local area network (LAN).

Demand Data Receiving Component

Demand data receiving component 110 receives demand data from one or more sources, such as a client device 102. For example, client device 102 establishes a connection over the computer network with system 100 and transmits (e.g., using Hypertext Transfer Protocol (HTTP)) demand data to system 100. Demand data receiving component 110 may store the demand data in demand data database 112, which may be external (e.g., remote) to system 100 (as depicted in FIG. 1), or may be internal to system 100. Demand data database 112 may be volatile or non-volatile storage. Demand data database 112 stores one or more instances of demand data, each instance representing a different set of demand data. Each instance of demand data is time series data that comprises a plurality of values, each corresponding to a different time period. Although the time period in the following examples corresponds to a day, embodiments are not so limited. For example, each demand value in demand data may correspond to a second, a minute, an hour, a week, or a month. A demand value may represent virtually any unit corresponding to a time period, such as a dollar value in sales for a day, a number of items of a particular type sold in a week, or a number of widgets constructed in an hour.

Demand data may comprise date and/or time data for each demand value. Alternatively, demand data may comprise a single date and/or time data for a single demand value (e.g., the first demand value in the demand data) and the date/time data may be derived for each of the remaining demand values based on that single date/time data. For example, if demand data is for a single year's worth of data and the first demand value is associated with date data that indicates May 1, then the date of each of the remaining demand values in the demand data may be inferred. For example, the second demand value would correspond to May 2, the third demand value would correspond to May 3, and the $365^{th}$ demand value might correspond to April 30, depending on whether the corresponding year is a leap year.

Mask Generation Component

In an embodiment, mask generation component 120 generates a mask for days that have unusual high or low demand data. Before generating a mask, mask generation component 120 may first read a demand data set from demand data database 112 and store a copy of the demand data set in volatile storage, such as random access memory (RAM). Mask generation component 120 then analyzes this (local) copy in order to generate a mask. A mask is an identification of one or more demand values that are candidates for being adjusted during a decomposition phase. An unusual demand value is a demand value that is very different from its adjacent demand values. For example, any demand value that is +/−20% of an adjacent demand value is considered an unusual demand value. In a more sophisticated example, a mean value and a standard deviation is computed for each time window (e.g., two weeks) around a demand value. If a demand value is greater than one or two standard deviations away from the mean, then the demand value is considered an unusual demand value.

In an embodiment, demand data may comprise one or more missing demand values. For example, demand data may comprise 353 demand values, each corresponding to a different day in a year. If there are 365 days in that year, then there are 12 missing demand values. In this embodiment, mask generation component 120 generates a mask for days that have missing demand data. The mask identifies each day that has missing demand data.

In a related embodiment, a process for determining missing demand values for missing days only proceeds if the number of missing demand values is less than a threshold percentage (e.g., 20%) of the overall time period. For example, if there are over 72 missing demand values for a year's worth of daily demand values, then the process for determining missing demand values will not proceed. In a related embodiment, the process does not proceed if there is a threshold number of consecutive days with missing values. For example, if there is a sequence of four consecutive days with missing demand data, then the process does not proceed.

Data Imputation Component

Data imputation component 130 generates an imputed demand value for each missing demand value in demand data, if there are missing demand values. Generation of an imputed demand value may be performed in one or more ways. For example, an imputed demand value may be the average of the surrounding two weeks-worth of demand values. As another example, an imputed demand value may be a weighted average where the nearer in time a surrounding demand value is to the missing demand value, the greater weight that value has over demand values that are farther away from the missing demand value. Thus, if a missing value corresponds to June 15, then a demand value for June 16 will be weighted higher than a demand value for June 17.

As another example, an imputed demand value may be generated based on corresponding days of the week. For example, if a missing demand value corresponds to a Friday, then the imputed demand value may be the four nearest Fridays that have demand values.

First SSA Decomposition Component

First SSA decomposition component 140 performs multiple steps in order to update demand values that are associated with a mask. First SSA decomposition component 140 constructs a trajectory matrix, which is constructed based on time series demand data X, defined as $X=(x_1, \ldots, x_N)$ and has a length of N, meaning there are N demand values in the time series demand data set. Another variable is L, which is defined as $(1<L<N)$ and indicates a window length. Another variable is K, which is defined as $K=N-L+1$. The value of L may be selected such that the value of L and K are similar. For example, the value of L may be half of the number of demand values in demand data X.

Trajectory matrix M is a L×K matrix that comprises a series of vectors M of length L. $M=[M_1, \ldots, M_K]$, where $M_1=(x_1, \ldots, x_L)$, $M_2=(x_2, \ldots, x_{L+1})$, ... $M_K=(x_K, \ldots, x_N)$.

After the trajectory matrix M is constructed, first SSA decomposition component 140 performs singular value decomposition (SVD). SVD involves computing a set S, where $S=MM^T$, $\lambda_1, \ldots, \lambda_L$ are eigenvalues of S taken in descending order of magnitude (i.e., $\lambda_1 \geq \ldots \geq \lambda_L \geq 0$), and $U_1, \ldots, U_L$ is the orthogonal system of the eigenvectors of the matrix S corresponding to these eigenvalues. If L is roughly equal to K, then S may be equal to M (instead of $MM^T$) and, thus, SVD may be performed directly on M instead of on S.

Then set d is defined as $d=\text{rank } M=\max\{i, \text{ such that } \lambda_i>0\}$ and $V_i=M^T U_i/\sqrt{\lambda_i}$ $(i=1, \ldots, d)$. In this notation, the SVD of the trajectory matrix M can be written as $M=M_1+ \ldots +M_d$, where $M_i=\sqrt{\lambda_i}*U_i V_i^T$ are matrices having rank 1. Such matrices are referred to as elementary matrices. The collection $(\sqrt{\lambda_i}, U_i, V_i)$ ith eigentriple" (ET) of the SVD. Vectors are the left singular vectors of the matrix M, numbers $\sqrt{\lambda_i}$ are the singular values and provide the singular spectrum of M, which gives the name to SSA. Vectors $\sqrt{\lambda_i}*V_i$ are referred to as vectors of principal components (PCs).

After first SSA decomposition component 140 performs a SVD of the trajectory matrix, first SSA decomposition component 140 performs a low rank approximation of the trajectory matrix. Low rank approximation is a technique in machine learning. A matrix with a large number of dimensions usually has a high matrix rank due to the random noise or anomalies inside the matrix. On the other side, the matrix usually contains structured information. For example, the columns of a trajectory matrix are constructed from sliding windows of demand time series. This kind of structured info means that the matrix could be approximated by a matrix with a low matrix rank. In practice, the approximated low rank matrix is promising for capturing the main signal and discarding the random noise of the original matrix.

Low rank approximation involves selecting components based on the largest singular values such that the selected singular values occupy a threshold percentage (e.g., 98%) of the total energy of the singular values. If the number of components (or the threshold percentage) is too large, then the low rank approximation will likely encounter an overfitting problem by learning too many details in the time series datasets especially on the noise or random fluctuations, therefore impacting its performance on the new data. If the number of components (or the threshold percentage) is too small, then it is highly probable that the low rank approximation will cause underfitting issues and, therefore, the main signals might not be able to be well captured.

$\sqrt{\lambda_i}$ is a singular value of M and $\lambda_i$ represents energy of the singular value. The total energy of the singular values is $\lambda_i+ \ldots +\lambda_d$. Each of one or more sequences of energy values is considered, beginning with the first energy value, $\lambda_i$. If the value of $\lambda_i$ represents greater than the threshold percentage of the total energy, then only the corresponding singular value is selected. Otherwise, $\lambda_1+\lambda_2$ is computed and checked to verify whether that energy sum represents greater than the threshold percentage of the total energy. If so, then the two corresponding singular values are selected. Otherwise, $\lambda_1+\lambda_2+\lambda_3$ is computed and checked to verify whether that energy sum represents greater than the threshold percentage of the total energy. The process continues until a sum of squares of a sequence of singular values is computed that represents the threshold percentage of the total energy. Then, a set of components that correspond to that sequence of singular values is selected. For example, if $\lambda_1$ and $\lambda_2$ are the selected energy values, then $\{U_1, U_2\}$ and $\{V_1, V_2\}$ are components that are selected for generating a low rank approximation of the trajectory matrix.

The first SSA decomposition component 140 then estimates the trend and seasonality by computing a diagonal averaging of the approximated trajectory matrix. For example, suppose that the components determined using the process above are $\{U_1, U_2, \ldots, U_c\}$ and $\{V_1, V_2, \ldots, V_c\}$. The trajectory matrix M may be approximated by $\sim M=\sqrt{\lambda_1}U_1^*V_1^T+\sqrt{\lambda_2}U_2^*V_2^T+ \ldots +\sqrt{\lambda_c}U_c^*V_1^c$, the result of which $\sim M$ is used for diagonal averaging to estimate the trend and seasonality. An output of the diagonal averaging is a reconstructed demand data set that is based on the original demand data set. Thus, if the original demand data set includes 365 demand values, then the reconstructed demand data set includes 365 demand values. If the original demand data set has missing values, then the reconstructed demand data set may include more demand values than the original demand data set.

Update Demand Values Associated with Masks

After the trend and seasonality are estimated, demand values (in the demand data set) that are associated with masks are updated based on the estimation. The estimation contains both trend and seasonality information and are not distinguished separately. Such an update may be performed by first SSA decomposition component 140 or another component of system 100. Demand values in the demand data set that are not associated with masks are not updated.

Termination Condition

After the update, a termination condition is checked to determine whether first SSA decomposition component 140 should perform another decomposition based on the updated demand values. The termination condition may be a number of times that first SSA decomposition component 140 has performed a decomposition relative to the demand data set in question. (Each performance of a decomposition relative to a demand data set is referred to as an iteration.)

Additionally or alternatively, the termination condition may involve computing an absolute difference between the current updated demand data set and the original demand data set and comparing that absolute difference with the absolute difference between the previous updated demand data set and the original demand data set (meaning that the termination condition might not be checked until the third iteration). If the difference between the two absolute differences is relatively small (e.g., less than a 5% change from the second to last computed difference and the last computed difference), then the termination condition is true and the process proceeds to second SSA decomposition component 150, where a SSA decomposition is performed once last time. Otherwise, first SSA decomposition component 140 performs another iteration based on the updated demand values.

Second SSA Decomposition Component

Second SSA decomposition component 150 similarly performs a number of steps, such as constructing a trajectory matrix based on the updated demand values, performing a SSA of the constructed trajectory matrix, and performing a low rank approximation of the constructed trajectory matrix. The low rank approximation that second SSA decomposition component 150 performs may be different than the low rank approximation that first SSA decomposition component 150 performs. For example, based on the results of the SVD, second SSA decomposition component 150 selects components based on a difference between of consecutive singular values. According to the above notations, L is an eigenvalue of $S=MM^T$ and a singular value of M is $\sqrt{\lambda_i}$; thus, the difference of consecutive singular values is based on $\sqrt{\lambda_1}$, $\sqrt{\lambda_2}, \ldots, \sqrt{\lambda_L}$, such as between $\sqrt{\lambda_1}$ and $\sqrt{\lambda_2}$ and between $\sqrt{\lambda_2}$ and $\sqrt{\lambda_3}$. There are L singular values $\sqrt{\lambda_1}, \sqrt{\lambda_2}, \ldots, \sqrt{\lambda_L}$. $\text{Diff}_1$ is defined as the difference between $\sqrt{\lambda_1}$ and $\sqrt{\lambda_2}$, $\text{Diff}_2$ is defined as the difference between $\sqrt{\lambda_2}$ and $\sqrt{\lambda_3}$, and so forth until $\text{Diff}_{L-1}$ is defined as the difference between $\sqrt{\lambda_{L-1}}$ and $\sqrt{\lambda_L}$. A certain percentile is determined (e.g., $98^{th}$ percentile), which may be a default percentile, and then the Diff value (among all the Diff values) at that percentile is determined. For example, the $98^{th}$ percentile of the Diff values is 0.8, which is considered a threshold value. Then each $\text{Diff}_i$ is compared to the threshold value and the largest index i is selected, such that $\text{Diff}_i$ is larger than the threshold. Therefore, the components that are associated with $\sqrt{\lambda_1}$ to $\sqrt{\lambda_i}$ are selected for a low rank approximation of the trajectory matrix.

Thereafter, second SSA decomposition component 150 (similar to first SSA decomposition component 140) performs a diagonal averaging of the approximated trajectory matrix in order to estimate trend and seasonality. An output of this diagonal averaging is a reconstructed demand data set that is based on the updated demand data set that was input to second SSA decomposition component 150.

The reconstructed demand data set represents baseline demand, which contains trend and seasonality information. The number of values in the reconstructed demand data set is the same as the number of values represented by the original demand data set, even though the original demand data set may be missing some demand values. For example, an original demand data set may represent all the days in a particular calendar year but is missing five demand values. Nevertheless, due to data imputation, the reconstructed demand data set contains 365 demand values.

Remainder Component

Remainder component 160 computes a difference between this baseline demand and the original demand data set. This difference is referred to as "remainder demand." This difference is computed by, for each time period (e.g., each day) reflected in the original demand data set, subtracting (1) the baseline demand value corresponding to that time period from (2) the original demand value corresponding to that time period. Thus, if there are 365 time periods, then there are 365 original demand values (if there are no imputed data values), 365 baseline demand values, and 365 remainder demand values. For days with missing values, baseline demand values and remainder demand values are not included as part of the output.

Process Overview

Figure 2:
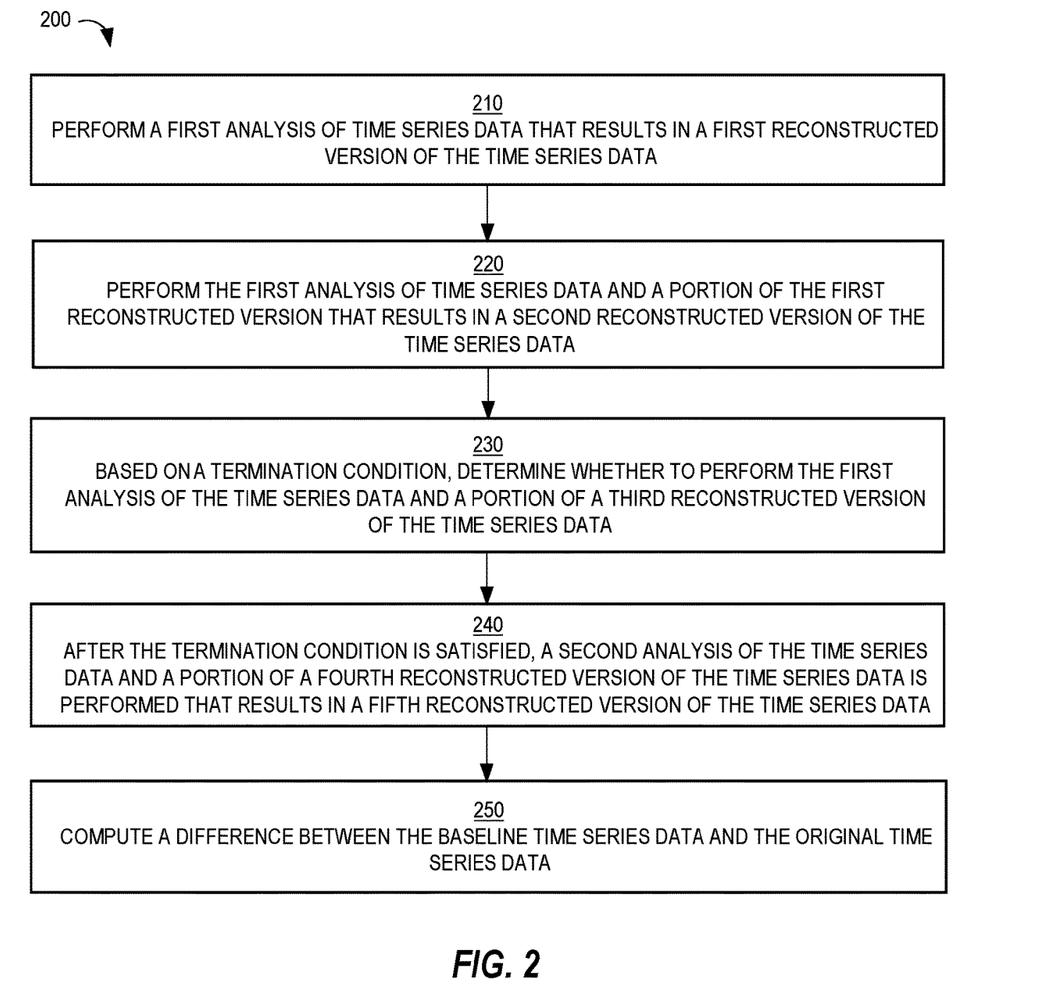
FIG. 2 is a flow diagram that depicts an example process for implementing an iterative SSA technique, in an embodiment

FIG. 2 is a flow diagram that depicts an example process 200 for implementing an iterative SSA technique, in an embodiment. Process 200 may be performed by different components of system 100.

At block 210, a first analysis of time series data is performed that results in a first reconstructed version of the time series data. The first analysis involves a SSA decomposition, which comprises a SVD of a constructed trajectory matrix and a low rank approximation of the trajectory matrix. Block 210 may be preceded by a determination of which values in the time series data are unusual values based on surrounding values in the time series data. Block 210 may be performed by first SSA decomposition component 140.

At block 220, the first analysis of the time series data and a portion of the first reconstructed version is performed that results in a second reconstructed version of the time series data. The portion of the first reconstructed version may correspond to values in the time series data that are either unusual or missing. Again, block 220 may be performed by first SSA decomposition component 140.

At block 230, based on a termination condition, it is determined whether to perform the first analysis of the time series data and a portion of a third reconstructed version of the time series data. The third reconstructed version may be the second reconstructed version of a subsequent version of the time series data. One example of a termination condition is a number of times the first analysis is performed.

Another example of a termination condition is the extent to which the difference between the time series data and a reconstructed version of the time series data changes from one first analysis to another. For example, a first difference between the time series data and the first reconstructed version is computed. Such a computation may involve computing a difference between each value in the time series data and a corresponding value in the first reconstructed version of the time series data. Then an absolute value of each difference is computed and summed to result in the first difference. Similarly, a second difference between the time series data and the second reconstructed version is computed. If the second difference is very similar to the first difference, then the termination condition is satisfied. Otherwise, the first analysis is performed again, but with the second reconstructed version instead of the time series data or the first reconstructed version.

At block 240, after the termination condition is satisfied, a second analysis of the time series data and a portion of a fourth reconstructed version of the time series data is performed that results in a fifth reconstructed version of the time series data. The fourth reconstructed version of the time series data may be the third reconstructed version of the time series data or may be a version that is generated based directly (or indirectly) on the third reconstructed version. The second analysis is different than the first analysis. For example, instead of implementing an energy-based method in order to select components for approximating a corresponding trajectory matrix, a percentile method is implemented in order to select the components. Like the first analysis, the second analysis outputs an estimated trend and seasonality information that is used to generate a reconstructed version of the time series data, which this reconstructed version is considered the "baseline time series data." Block 240 may be performed by second SSA decomposition component 150.

At block 250, a difference between the baseline time series data and the original time series data is computed. The difference represents a remainder time series data. Some of the values in the remainder time series data may be positive while other values may be negative. Block 250 may be performed by remainder component 160. The remainder time series data may be analyzed manually or automatically to determine a correlation with events that occurred during the time range of the original time series data.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
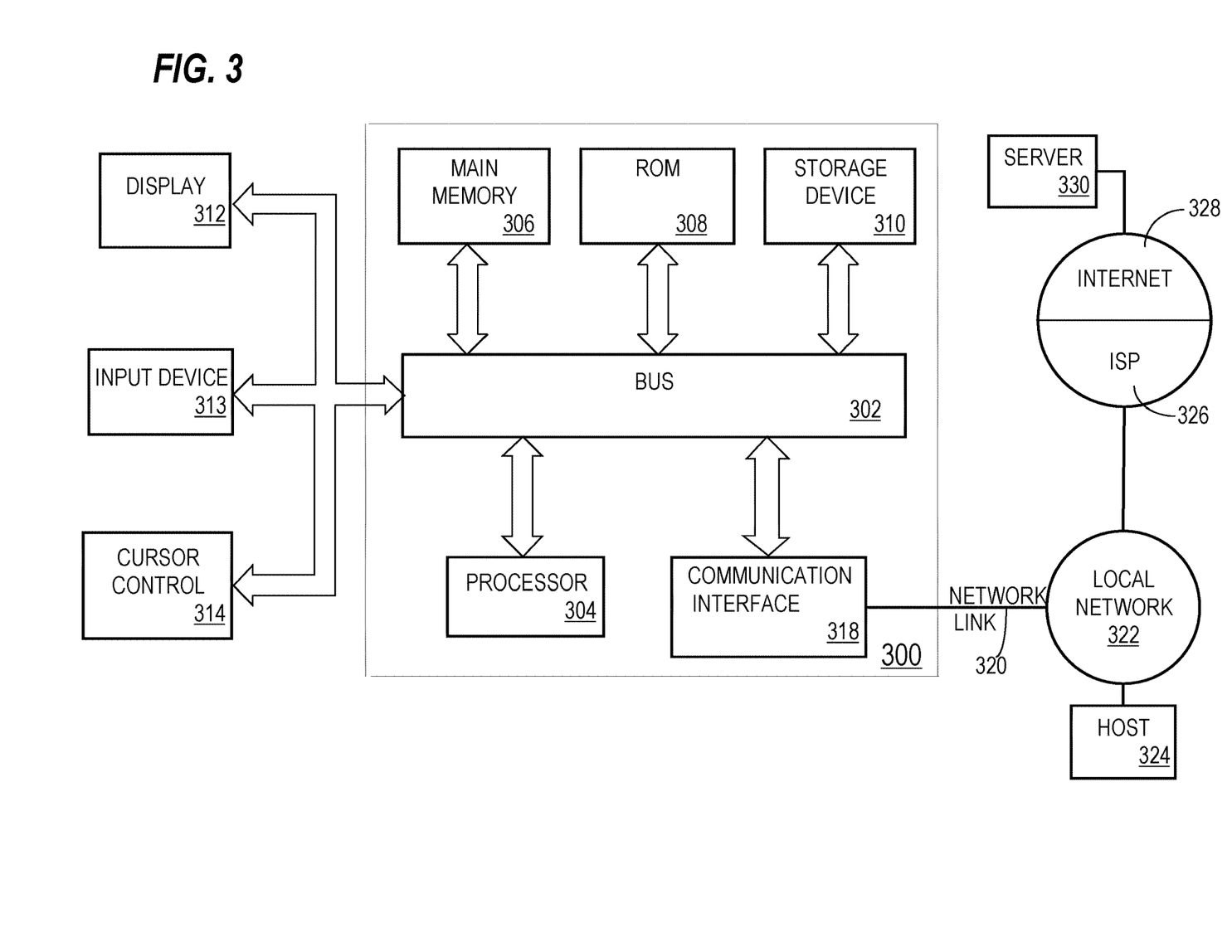
FIG. 3 is a block diagram that illustrates a computer system upon which an embodiment of the invention may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for anomaly detection and removal in noisy demand datasets comprising:
   storing a demand dataset from a demand database in a local memory;
   generating a mask for one or more unusual values of time series data, the time series data comprising a plurality of demand values of the demand dataset accessed from the local memory, individual demand values representing a number of demand events occurring within a particular time period, and the one or more unusual values corresponding to unusually high or unusually low demand values for a subset of the particular time period;
   performing a first analysis, of the time series data, that results in a first reconstructed version of the time series data;
   wherein performance of the first analysis comprises:
      constructing a first trajectory matrix based on the time series data;
      performing a singular value decomposition of the first trajectory matrix;
      based on results of the singular value decomposition of the first trajectory matrix, performing a low rank approximation of the first trajectory matrix that results in a first approximated trajectory matrix that excludes one or more noisy values from the first trajectory matrix;
estimating trend and seasonality in the time series data based on diagonal averaging of the first approximated trajectory matrix; and
based on the estimating, updating one or more values in the time series data;
performing the first analysis, of the time series data and a portion of the first reconstructed version, that results in a second reconstructed version of the time series data, the portion of the first reconstructed version corresponding to one or more missing or unusual demand values from the time series data;
determining a first difference between the time series data and the first reconstructed version of the time series data based at least in part on a sum of absolute values of differences between each value of the time series data and a corresponding value of the first reconstructed time series data;
determining a second difference between the time series data and the second reconstructed version of the time series data based at least in part on a sum of absolute values of differences between each value of the time series data and a corresponding value of the second reconstructed time series data;
based on a termination condition, determining whether to perform the first analysis of the time series data and a portion of a third reconstructed version of the time series data, the termination condition being based on a comparison between the first difference and the second difference;
performing a second analysis, of the time series data and a portion of a fourth reconstructed version of the time series data, that results in baseline time series data, wherein the second analysis is different than the first analysis, the baseline time series data representing expected demand values; and
generating remainder time series data based at least in part on computing a difference between the time series data and the baseline time series data, the remainder time series data representing discrepancies between the baseline time series data and the time series data;
wherein the method is performed by one or more computing devices.

2. The method of claim 1, further comprising:
identifying, within the time series data, one or more original values that are unusually high or unusually low based on one or more criteria;
wherein the portion of the first reconstructed version comprises one or more reconstructed values that correspond to the one or more original values.

3. The method of claim 1, further comprising:
identifying, within the time series data, one or more time periods that have a missing value;
generating one or more imputed values, each for a different time period of the one or more time periods;
wherein performing the first analysis of the time series data comprises performing the first analysis of the time series data and one or more imputed values;
wherein the portion of the first reconstructed version comprises one or more reconstructed values that correspond to the one or more time periods.

4. The method of claim 1, wherein the third reconstructed version is either the second reconstructed version or is a version that is based on the second reconstructed version.

5. The method of claim 1, wherein the first analysis comprises an energy-based method to identify a first set of components that is used to generate the first reconstructed version and the second analysis comprises a percentile method to identify a second set of components that is used to generate the baseline time series data.

6. The method of claim 1, wherein performance of the second analysis comprises:
constructing a trajectory matrix based on the time series data and the portion of the fourth reconstructed version;
performing a singular value decomposition of the trajectory matrix;
based on results of the singular value decomposition of the trajectory matrix, performing a low rank approximation of the trajectory matrix that results in an approximated trajectory matrix;
estimating trend and seasonality in the time series data and the baseline time series data based on diagonal averaging of the approximated trajectory matrix;
based on the estimating, updating one or more values in the time series data.

7. A method comprising:
storing a demand dataset from a demand database in a local memory;
generating a mask for one or more unusual values of time series data, the time series data comprising a plurality of demand values of the demand dataset accessed from the local memory, individual demand values representing a number of demand events occurring within a particular time period, and the one or more unusual values corresponding to unusually high or unusually low demand values for a subset of the particular time period;
performing a first analysis, of the time series data, that results in a first reconstructed version of the time series data;
performing the first analysis, of the time series data and a portion of the first reconstructed version, that results in a second reconstructed version of the time series data;
based on a termination condition, determining whether to perform the first analysis of the time series data and a portion of a third reconstructed version of the time series data;
performing a second analysis, of the time series data and a portion of a fourth reconstructed version of the time series data, that results in baseline time series data, wherein the second analysis is different than the first analysis, the baseline time series data representing expected demand values;
generating remainder time series data based at least in part on computing a difference between the time series data and the baseline time series data, the remainder time series representing discrepancies between the baseline time series data and the time series data;
wherein performance of the second analysis comprises:
determining a plurality of singular values that were generated based on a singular value decomposition of a trajectory matrix;
determining a plurality of difference values, wherein each difference value in the plurality of difference values is a difference between consecutive singular values in the plurality of singular values;
determining a certain percentile of the plurality of difference values;
automatically identifying a threshold value that represents the certain percentile of the plurality of difference values;

analyzing the plurality of difference values in a particular order, wherein analyzing comprises:
selecting a difference value from among the plurality of difference values;
determining whether the difference value is less than the threshold value; and
in response to determining that the difference value is greater than the threshold value, cease analyzing the plurality of difference values;
based on the last selected difference value, identifying a set of components from the singular value decomposition of the trajectory matrix;
approximating the trajectory matrix based on the set of components;
wherein the method is performed by one or more computing devices.

8. The method of claim 1, further comprising:
determining a first difference between the time series data and a first particular reconstructed version of the time series data;
determining a second difference between the time series data and a second particular reconstructed version of the time series data;
wherein the termination condition is based on the first difference and the second difference.

9. One or more non-transitory storage media storing instructions which, when executed by one or more computing devices, cause:
storing a demand dataset from a demand database in a local memory;
generating a mask for one or more unusual values of time series data, the time series data comprising a plurality of demand values of the demand dataset accessed from the local memory, individual demand values representing a number of demand events occurring within a particular time period, and the one or more unusual values corresponding to unusually high or unusually low demand values for a subset of the particular time period;
performing a first analysis, of the time series data, that results in a first reconstructed version of the time series data;
performing the first analysis, of the time series data and a portion of the first reconstructed version, that results in a second reconstructed version of the time series data;
based on a termination condition, determining whether to perform the first analysis of the time series data and a portion of a third reconstructed version of the time series data;
performing a second analysis, of the time series data and a portion of a fourth reconstructed version of the time series data, that results in baseline time series data, wherein the second analysis is different than the first analysis;
wherein performance of the second analysis comprises:
determining a plurality of singular values that were generated based on a singular value decomposition of a trajectory matrix;
determining a plurality of difference values, wherein each difference value in the plurality of difference values is a difference between consecutive singular values in the plurality of singular values;
determining a certain percentile of the plurality of difference values;
automatically identifying a threshold value that represents the certain percentile of the plurality of difference values;
analyzing the plurality of difference values in a particular order, wherein analyzing comprises:
selecting a difference value from among the plurality of difference values;
determining whether the difference value is less than the threshold value;
in response to determining that the difference value is greater than the threshold value, cease analyzing the plurality of difference values;
based on the last selected difference value, identifying a set of components from the singular value decomposition of the trajectory matrix;
approximating the trajectory matrix based on the set of components;
generating remainder time series data based at least in part on computing a difference between the time series data and the baseline time series data, the remainder time series data representing discrepancies between the baseline time series data and the time series data.

10. The one or more non-transitory storage media of claim 9, wherein the instructions, when executed by the one or more computing devices, further cause:
identifying, within the time series data, one or more original values that are unusually high or unusually low based on one or more criteria;
wherein the portion of the first reconstructed version comprises one or more reconstructed values that correspond to the one or more original values.

11. The one or more non-transitory storage media of claim 9, wherein the instructions, when executed by the one or more computing devices, further cause:
identifying, within the time series data, one or more time periods that have a missing value;
generating one or more imputed values, each for a different time period of the one or more time periods;
wherein performing the first analysis of the time series data comprises performing the first analysis of the time series data and one or more imputed values;
wherein the portion of the first reconstructed version comprises one or more reconstructed values that correspond to the one or more time periods.

12. The one or more non-transitory storage media of claim 9, wherein the third reconstructed version is either the second reconstructed version or is a version that is based on the second reconstructed version.

13. The one or more non-transitory storage media of claim 9, wherein the first analysis comprises an energy-based method to identify a first set of components that is used to generate the first reconstructed version and the second analysis comprises a percentile method to identify a second set of components that is used to generate the baseline time series data.

14. The one or more non-transitory storage media of claim 9, wherein performance of the first analysis comprises:
constructing a first trajectory matrix based on the time series data;
performing a singular value decomposition of the first trajectory matrix;
based on results of the singular value decomposition of the first trajectory matrix, performing a low rank approximation of the first trajectory matrix that results in a first approximated trajectory matrix;
estimating trend and seasonality in the time series data based on diagonal averaging of the first approximated trajectory matrix;
based on the estimating, updating one or more values in the time series data.

15. The one or more non-transitory storage media of claim 9, wherein the trajectory matrix comprises a second trajectory matrix, the singular value decomposition comprises a second singular value composition, and performance of the first analysis comprises:
- determining, based on a first plurality of singular values that were generated based on a first singular value decomposition of a first trajectory matrix, a total energy of the first plurality of singular values;
- determining a threshold percentage of the total energy;
- identifying a subset of the first plurality of singular values, wherein the subset represents an energy value that is less than or equal to the threshold percentage;
- based on the subset of the first plurality of singular values, identifying a set of components from the first singular value decomposition of the first trajectory matrix;
- approximating the first trajectory matrix based on the set of components.

16. The one or more non-transitory storage media of claim 9, wherein the instructions, when executed by the one or more computing devices, further cause:
- determining a first difference between the time series data and a first particular reconstructed version of the time series data;
- determining a second difference between the time series data and a second particular reconstructed version of the time series data;
- wherein the termination condition is based on the first difference and the second difference.

17. The one or more non-transitory storage media of claim 15, wherein performing the low rank approximation of the first trajectory matrix comprises selecting a subset, of a first plurality of singular values, that occupy a threshold percentage of the total energy of the first plurality of singular values.

18. The method of claim 1, wherein performing the low rank approximation comprises selecting a subset, of a plurality of singular values, that occupy a threshold percentage of a total energy of the plurality of singular values.

19. The method of claim 1, wherein the baseline time series data comprises a plurality of baseline demand values, and the remainder time series data comprises a plurality of remainder demand values.

20. The method of claim 1, wherein the particular time period comprises a day within a calendar year, and the individual demand values correspond to each day within the calendar year.

* * * * *